United States Patent
Pfaff et al.

(10) Patent No.: US 10,200,235 B2
(45) Date of Patent: Feb. 5, 2019

(54) DISTRIBUTED DATABASE STRUCTURE FOR LOGICAL AND PHYSICAL NETWORK DATA

(71) Applicant: Nicira, Inc., Palo Alto, CA (US)

(72) Inventors: Benjamin L. Pfaff, Redwood City, CA (US); Justin Pettit, Los Altos Hills, CA (US)

(73) Assignee: NICIRA, INC., Palo Alto, CA (US)

( * ) Notice: Subject to any disclaimer, the term of this patent is extended or adjusted under 35 U.S.C. 154(b) by 331 days.

(21) Appl. No.: 14/944,512

(22) Filed: Nov. 18, 2015

(65) Prior Publication Data

US 2017/0126552 A1    May 4, 2017

Related U.S. Application Data

(60) Provisional application No. 62/249,247, filed on Oct. 31, 2015.

(51) Int. Cl.

| | |
|---|---|
| G06F 15/167 | (2006.01) |
| H04L 12/24 | (2006.01) |
| H04L 12/931 | (2013.01) |
| H04L 12/721 | (2013.01) |
| H04L 12/771 | (2013.01) |
| H04L 12/713 | (2013.01) |
| G06F 17/30 | (2006.01) |
| H04L 12/46 | (2006.01) |
| H04L 29/08 | (2006.01) |

(52) U.S. Cl.
CPC ...... *H04L 41/046* (2013.01); *G06F 17/30339* (2013.01); *H04L 12/4633* (2013.01); *H04L 45/38* (2013.01); *H04L 45/56* (2013.01); *H04L 45/586* (2013.01); *H04L 49/70* (2013.01); *H04L 67/1097* (2013.01)

(58) Field of Classification Search
CPC ....... H04L 41/12; H04L 41/145; H04L 45/14; H04L 45/28; H04L 45/38; G06F 9/45558
See application file for complete search history.

(56) References Cited

U.S. PATENT DOCUMENTS

| | | |
|---|---|---|
| 9,038,151 B1 | 5/2015 | Chua et al. |
| 9,325,630 B2 | 4/2016 | Graf |
| 9,755,965 B1 | 9/2017 | Yadav et al. |

(Continued)

*Primary Examiner* — Dustin Nguyen
(74) *Attorney, Agent, or Firm* — Adeli LLP

(57) ABSTRACT

Some embodiments provide a method for a controller agent operating in a physical machine alongside a local managed forwarding element (MFE) that implements logical networks along with other MFEs in a physical network. From a centralized storage, the method receives a description of a physical network populated by other controller agents, a description of a logical network populated by a centralized controller, and a set of bindings between the logical and physical network populated by the plurality of other controller agents. From the local MFE, the method receives a description of physical network data relating to the local MFE and bindings between the logical and physical network for machines connected directly to the local MFE. The method populates the centralized storage with the data from the local MFE. The method generates forwarding data for the local MFE using the data received from the centralized storage and from the local MFE.

20 Claims, 12 Drawing Sheets

(56) References Cited

U.S. PATENT DOCUMENTS

| | | |
|---|---|---|
| 9,769,061 B2 | 9/2017 | Chinthalapati et al. |
| 2004/0177139 A1 | 9/2004 | Schuba et al. |
| 2012/0044813 A1* | 2/2012 | Nandagopal ............ H04L 45/28 370/242 |
| 2012/0155467 A1 | 6/2012 | Appenzeller |
| 2013/0103817 A1* | 4/2013 | Koponen ............ G06F 9/45558 709/223 |
| 2013/0163427 A1 | 6/2013 | Beliveau et al. |
| 2014/0195666 A1 | 7/2014 | Dumitriu et al. |
| 2014/0241346 A1 | 8/2014 | Cohn et al. |
| 2014/0247753 A1 | 9/2014 | Koponen et al. |
| 2015/0016456 A1 | 1/2015 | Ramanathan et al. |
| 2015/0142948 A1 | 5/2015 | Szabo et al. |
| 2015/0172169 A1* | 6/2015 | DeCusatis ............... H04L 45/14 718/1 |
| 2015/0295849 A1 | 10/2015 | Xia et al. |
| 2015/0381428 A1* | 12/2015 | Ong ........................ H04L 41/12 709/223 |
| 2016/0006663 A1 | 1/2016 | Zhang |
| 2016/0050117 A1 | 2/2016 | Voellmy et al. |
| 2016/0173338 A1* | 6/2016 | Wolting ................ H04L 41/145 709/223 |
| 2016/0182379 A1 | 6/2016 | Mehra et al. |
| 2016/0218918 A1 | 7/2016 | Chu et al. |
| 2016/0241436 A1 | 8/2016 | Fourie et al. |
| 2016/0308766 A1 | 10/2016 | Register et al. |
| 2016/0352613 A1 | 12/2016 | Narayanan et al. |
| 2017/0126471 A1 | 5/2017 | Pfaff et al. |
| 2017/0126551 A1 | 5/2017 | Pfaff et al. |

* cited by examiner

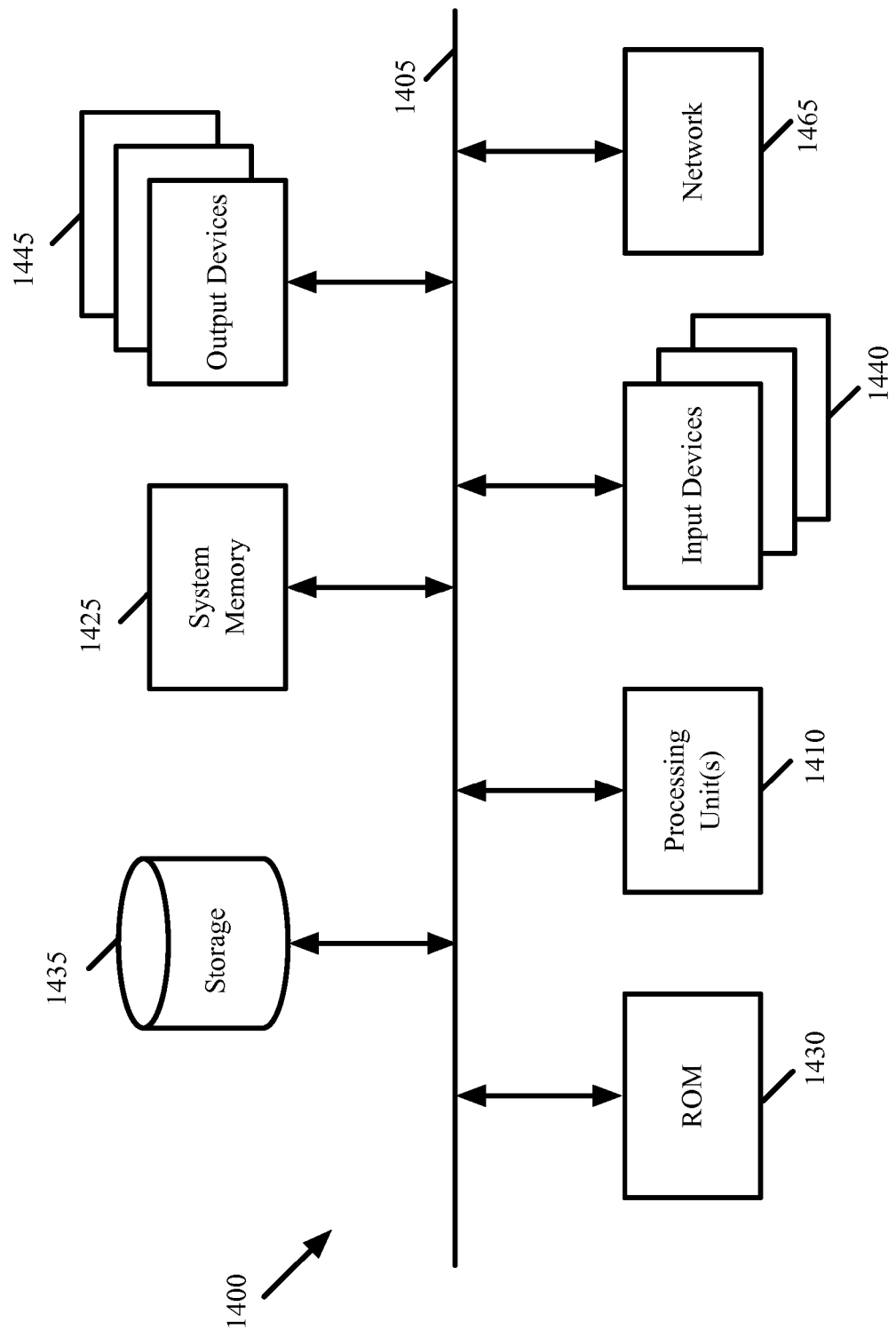

DISTRIBUTED DATABASE STRUCTURE FOR LOGICAL AND PHYSICAL NETWORK DATA

BACKGROUND

A flow-based software virtual switch operating on a host machine will typically receive flow entries (e.g., OpenFlow flow entries) from a centralized network controller. These flow entries may relate to numerous logical networks implemented by the physical network of which the software virtual switch is a part. This requires the network controller to calculate the flow entries for a multitude of such flow-based switches, which can scale quickly as the number and size of the logical networks grows. As such, more efficient mechanisms for calculating these flow entries and handling logical networks within a datacenter or group of datacenters are required.

BRIEF SUMMARY

Some embodiments of the invention provide a network control system that includes a centralized network controller cluster and local controller agents operating on host machines to manage forwarding elements on the host machines. The centralized network controller, in some embodiments, includes a storage (e.g., a database) with separate tables describing logical networks, the physical network managed by the network control system, and bindings between the physical and logical networks.

The controller populates the logical network table based on information received from one or more management systems (e.g., cloud management systems), with the logical network information from the management systems converted into a standard format by the network controller. The physical network table and the bindings table are populated by the local controller agents, who detect this physical network information (e.g., the existence and tunneling properties of the various forwarding elements) and binding information (e.g., the physical location and addresses of machines that connect to ports of logical forwarding elements) from their respective managed forwarding elements.

In some embodiments, the physical network information includes descriptions of each managed forwarding element in the network (i.e., that implement the logical networks), enabling the creation of overlay networks. This information may include the tunnel encapsulations the managed forwarding element supports (e.g., the type of encapsulation as well as its tunnel endpoint address and any necessary security keys) and, if the managed forwarding element is a gateway that connects to external networks, information about its gateway ports. The binding information of some embodiments identifies the locations of logical ports within the physical network. That is, for each logical port (e.g., of a logical switch) to which a machine (e.g., a virtual machine or other data compute node) connects, the binding table identifies an address (e.g., MAC address) and physical location of the machine in the network (e.g., the managed forwarding element to which the machine connects).

The logical network information stored in the logical network table, in some embodiments, includes all of the information to describe the logical network. Some embodiments convert this information from the management systems through which the logical network is defined into a set of logical flow entries. The logical flow entries each include a set of match conditions and a set of actions, but are not necessarily in a format readable by the managed forwarding elements. As an example, a definition of a logical switch will at least have logical flow entries for each logical port specifying to forward packets to that logical port when the packets have a layer 2 (e.g., MAC) address that corresponds to the logical port (so long as certain preconditions, such as the logical switch having been identified for the packet, are also met).

Some embodiments use a Boolean format for the logical flow entries that allows the compression of numerous flow entries into single table entries. The flow entries, when in a format readable by the managed forwarding elements of some embodiments (e.g., OpenFlow), may only match a single value per field, as opposed to a set or range of values. Thus, an access control list (ACL) entry that allows only TCP ports less than or equal to 1024 would create 1024 separate flow entries for the managed forwarding element. However, the Boolean format of some embodiments allows the use of less than/greater than operators, and therefore these can be expressed in a single table entry. Similarly, sets of valid (or excluded) network addresses can be grouped in a single entry, as can combinations of such sets.

The flow computation for the managed forwarding elements is performed by the local controller agents in some embodiments. Each local controller agent receives the logical network information as well as physical network and binding information populated by other local controller agents from the centralized controller, and uses this information along with its own physical network and binding information to generate flow entries for its local managed forwarding element. Thus, the local controller agents convert the logical flow entries provided in the Boolean format into flow entries in a format usable by their respective managed forwarding elements. For example, a logical flow entry that drops a packet having either X or Y as a destination network address (given other conditions) will be converted into two flow entries, one to drop packets with destination address X and one to drop packets with destination address Y. For logical flow entries that have more than one field with several possible matching values, some embodiments use conjunctive match entries to limit the number of resulting flow entries for the managed forwarding element.

The local controller agent also generates flow entries for the managed forwarding element that use the physical network and binding information. For example, the binding of a logical port to a particular managed forwarding element indicates to which managed forwarding element packets with the corresponding address should be tunneled, and the physical network data regarding that managed forwarding element specifies how to encapsulate packets for that tunnel. This data is converted into flow entries by the local controller agent. The generated flow entries are then provided to the managed forwarding element by the local controller agent.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 14 conceptually illustrates an electronic system with which some embodiments of the invention are implemented.

DETAILED DESCRIPTION OF THE INVENTION

Figure 1:
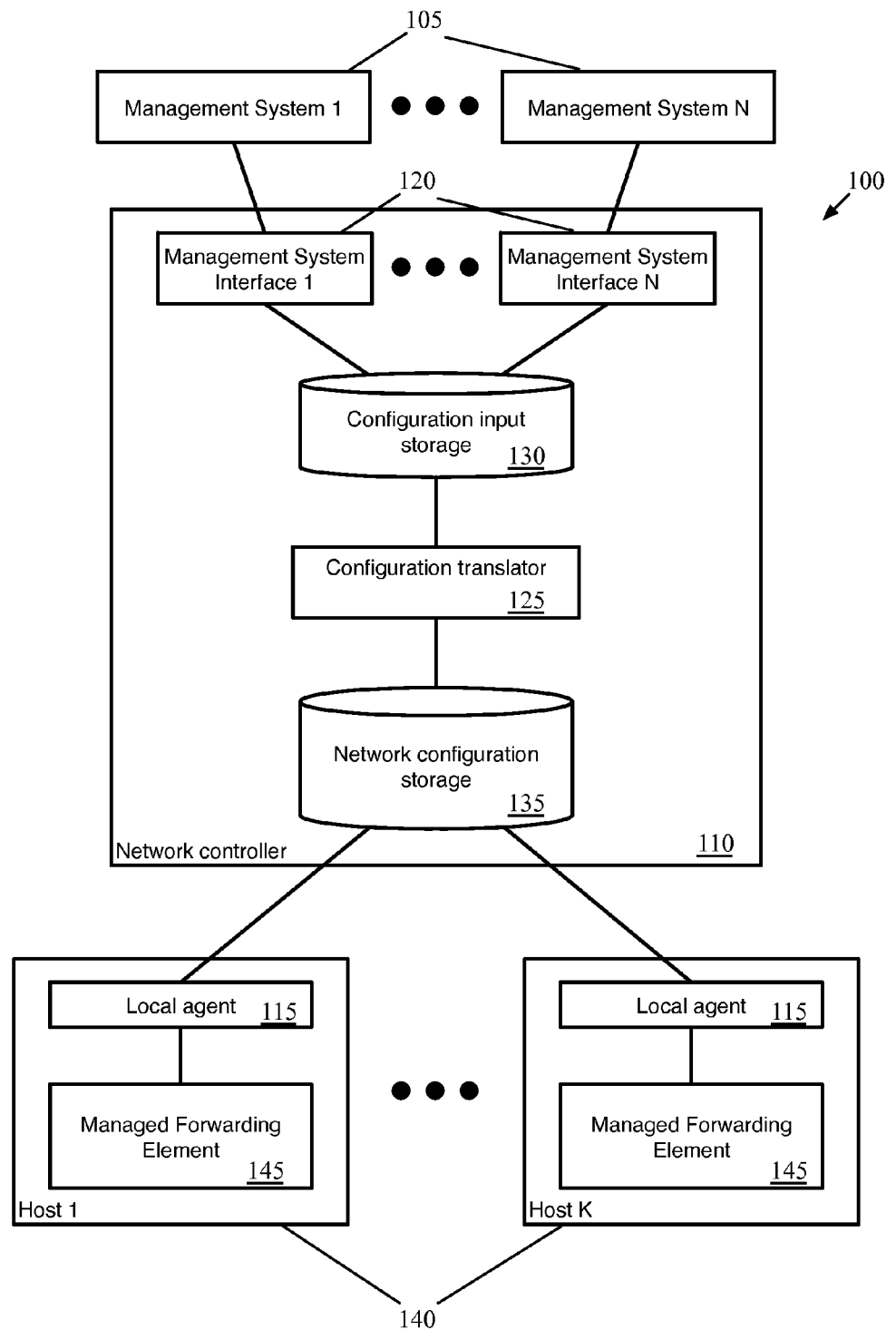
FIG. 1 conceptually illustrates such a network control system of some embodiments.

Some embodiments of the invention provide a network control system that includes a centralized network controller cluster and local controller agents operating on host machines to manage forwarding elements on the host machines. The centralized network controller, in some embodiments, includes a storage (e.g., a database) with separate tables describing logical networks, the physical network managed by the network control system, and bindings between the physical and logical networks.

The controller populates the logical network table based on information received from one or more management systems (e.g., cloud management systems), with the logical network information from the management systems converted into a standard format by the network controller. The physical network table and the bindings table are populated by the local controller agents, who detect this physical network information (e.g., the existence and tunneling properties of the various managed forwarding elements) and binding information (e.g., the physical location and addresses of machines that connect to ports of logical forwarding elements) from their respective managed forwarding elements (MFEs).

In some embodiments, the physical network information includes descriptions of each MFE in the network (i.e., that implement the logical networks), enabling the creation of overlay networks. This information may include the tunnel encapsulations the MFE supports (e.g., the type of encapsulation as well as its tunnel endpoint address and any necessary security keys) and, if the MFE is a gateway that connects to external networks, information about its gateway ports. The binding information of some embodiments identifies the locations of logical ports within the physical network. That is, for each logical port (e.g., of a logical switch) to which a machine (e.g., a virtual machine or other data compute node) connects, the binding table identifies an address (e.g., MAC address) and physical location of the machine in the network (e.g., the MFE to which the machine connects).

The logical network information stored in the logical network table, in some embodiments, includes all of the information to describe the logical network. Some embodiments convert this information from the management systems through which the logical network is defined into a set of logical flow entries. The logical flow entries each include a set of match conditions and a set of actions, but are not necessarily in a format readable by the managed forwarding elements. As an example, a definition of a logical switch will at least have logical flow entries for each logical port specifying to forward packets to that logical port when the packets have a layer 2 (e.g., MAC) address that corresponds to the logical port (so long as certain preconditions, such as the logical switch having been identified for the packet, are also met).

Some embodiments use a Boolean format for the logical flow entries that allows the compression of numerous flow entries into single table entries. The flow entries, when in a format readable my the MFEs of some embodiments (e.g., OpenFlow), may only match a single value per field, as opposed to a set or range of values. Thus, an access control list (ACL) entry that allows only TCP ports less than or equal to 1024 would create 1024 separate flow entries for the managed forwarding element. However, the Boolean format of some embodiments allows the use of less than/greater than operators, and therefore these can be expressed in a single table entry. Similarly, sets of valid (or excluded) network addresses can be grouped in a single entry, as can combinations of such sets.

The flow computation for the MFEs is performed by the local controller agents in some embodiments. Each local controller agent receives the logical network information as well as physical network and binding information populated by other local controller agents from the centralized controller, and uses this information along with its own physical network and binding information (from its local MFE) to generate flow entries for its local MFE. Thus, the local controller agents convert the logical flow entries provided in the Boolean format into flow entries in a format usable by their respective MFEs. For example, a logical flow entry that drops a packet having either X or Y as a destination network address (given other conditions) will be converted into two flow entries, one to drop packets with destination address X and one to drop packets with destination address Y. For logical flow entries that have more than one field with several possible matching values, some embodiments use conjunctive match entries to limit the number of resulting flow entries for the MFE.

The local controller agent also generates flow entries for the MFE that use the physical network and binding information. For example, the binding of a logical port to a particular MFE indicates to which MFE packets with the corresponding address should be tunneled, and the physical network data regarding that MFE specifies how to encapsulate packets for that tunnel. This data is converted into flow entries by the local controller agent. The generated flow entries are then provided to the MFE by the local controller agent.

The above describes the network control system of some embodiments. The following sections describe the architecture of this network control system, as well as the data storage formats used and conversion operations performed by this network control system of some embodiments. Section I describes the overall network control system architecture of some embodiments. Section II then describes in detail the tables for storing logical network, physical network, and binding data. Next, Section III describes the operations of a local controller agent, while Section IV describes the calculation of logical flow entries for a logical network. Finally, Section V describes an electronic system with which some embodiments of the invention are implemented.

I. Network Control System Architecture

As mentioned, in some embodiments, the network control system includes a centralized network controller cluster (e.g., a single controller or a cluster of controllers that share data) and local controller agents operating on host machines to manage forwarding elements on the host machines. The centralized network controller, in some embodiments, includes a storage (e.g., a database) with separate structures (e.g., database tables) describing logical networks, the physical network managed by the network control system, and bindings between the physical and logical networks.

FIG. 1 conceptually illustrates such a network control system 100 of some embodiments. As shown, the network control system 100 includes one or more management systems 105, a network controller 110, and one or more local agents 115. The management systems 105 are, in a sense, the client of the network control system. These management systems (e.g., cloud management systems), via their users and administrators, define the logical networks as they should optimally operate (i.e., the desired state for the logical networks). One example of such a management system is OpenStack, though multiple different management systems may be used to define logical networks for a single physical, managed network.

The network controller 110 includes management system interfaces 120 and a configuration translator 125, as well as a configuration input storage 130 and a network configuration storage 135. The controller 110 includes a management system interface 120 for each management system from which logical network information is received. In some embodiments, these interfaces 120 are plug-ins that are specifically designed for receiving information in a format specific to their respective management system 105 and converting that data into a normalized intermediate representation. That is, each management system may have its own format for a logical network configuration, and that configuration is converted by the management system interface into a format that the network controller 110 (and, specifically, the configuration translator 125) can understand and work with. One example of such an interface is a Neutron plugin, for interfacing with OpenStack.

Though shown in this figure as a single network controller 100, it should be understood that some embodiments may include a cluster of such network controllers, and different management systems may communicate with different network controllers in the cluster. For instance, the interface for a first management system may only be present on a subset of the network controllers of a cluster, while the interface for a different management system is only present on a different subset of the network controllers of the cluster. However, even when arranged in a cluster, the network controllers share the received and stored data.

The management system interfaces 120, as mentioned, receive data from the management systems 105 that defines logical networks. For instance, a user of one of the management systems might define a logical network with several logical switches connected to a logical router, with different ACL requirements for different ports of these logical forwarding elements (the logical switches and routers). The management system 105 will have its own specific format for this information, while the management system interface 120 translates the received information into the standardized format for the configuration input storage 130.

The configuration input storage 130 is a database, in some embodiments, that stores the logical network information from the management systems 105 in an intermediate format. The database schema used by the configuration input storage 130 is designed to be "impedance matched" with the conception of how logical networks are presented by the management systems 105. As an example, the configuration input storage 130 of some embodiments may include a logical switch table, a logical switch ports table, a logical router table, a logical router ports table, and an ACL table. The logical switch and logical router tables allow the users to define the structure of their logical networks, by defining the logical forwarding elements and assigning ports and ACL rules to those logical forwarding elements. The logical switch port and logical router port tables store the properties of each logical port in the logical networks, including addresses assigned to the port, what the port connects to (e.g., a logical switch or router, a VM, etc.), and other port information. Similarly, the ACL table stores the definition for each ACL rule, including the port(s) to which it applies, whether the rule applies to packets ingressing from or egressing through the port(s), and whether packets that match the rule should be dropped, allowed, etc.

The configuration translator 125 is responsible for translating the tables of the configuration input storage 130 (a north-facing database, that effectively interacts with the management systems) into the network configuration storage 135 (a south-facing database that effectively interacts with the local agents and, thus, the MFEs). The logical network configuration stored in the configuration input storage 130 of some embodiments is represented in terms of traditional network concepts (routers, switches, ports, and ACL rules), while the network configuration storage 135 stores this logical network information in terms of logical datapath flows, with match conditions and corresponding actions (in addition to physical network and logical-to-physical binding information populated by the local controller agents 115).

For example, based on the definition of a logical switch and its ports (and their associated addresses), logical forwarding entries may be put into the network configuration storage 135 that specify to set a particular logical port as an egress port for a packet when the packet has been assigned to the corresponding logical switch and has an address associated with the port. Similarly, ACL rules in the configuration input storage 130 are translated into match conditions and corresponding actions in the network configuration storage 135. The configuration translator 125 generates the logical flow entries using a specific Boolean format in some embodiments, which allows for the compression of multiple MFE-readable flow entries into single database table entries. This is because the use of "and", "or", and relational (greater than, less than, etc.) operators enables multiple values for a single field to be expressed succinctly, rather than with separate entries for each possible value. The details of the logical pipeline table will be described in greater detail below in Section II.

In addition to the logical flow data generated by the configuration translator 125, the network configuration storage 135 includes physical network data and binding data, which is populated by the local agents 115. Each local agent 115 operates on a host machine 140, and manages a managed forwarding element 145 operating on the host machine. In some embodiments, both the managed forwarding element 145 and the local agent 115 operate within virtualization software (e.g., a hypervisor) of the host machine. The host machine 140 also hosts data compute nodes (e.g., VMs, containers, etc.) that are the endpoints connected by the logical networks. In some embodiments, the managed forwarding elements 145 are flow-based MFEs (e.g., Open vSwitch) that process packets sent to and from the local data compute nodes by matching the packets against flow entries (e.g., OpenFlow entries) provided by their respective local agent 115.

The local agent 115 is responsible for extracting physical network and binding information from its local MFE 145, which the local agent then provides to the network configuration storage 135. This information may include the interfaces of the MFE 145, including the logical port assigned to each interface and the address of the interface. In addition, the reachability information for the transport node within the physical network will be extracted and provided to the network configuration storage. In some embodiments, the MFEs communicate through the physical network by encapsulating the logical network packets in tunnels (e.g., VXLAN, STT, GENEVE), and this tunnel information is required to be shared with the other MFEs in order for the other MFEs to know how to reach a given MFE. Thus, the addresses (e.g., the IP address) to use for a tunnel to a particular MFE 145 as well as the tunneling protocols supported by the MFE 145 are provided by the local agent 115 to the network configuration storage 135. The local agents 115 can then retrieve the information from the network configuration storage 135 relating to the other MFEs 145 and incorporate this information into the data used to configure their respective MFEs 145. The structure of this physical network and binding data of some embodiments will be described in greater detail below in Section II.

II. Network Configuration Storage

As indicated in the previous section, the network configuration storage stores three types of information: logical network data, physical network data, and binding information between the physical and logical network. Though shown in FIG. 1 as a single storage (e.g., a single database), this information is distributed between the controller cluster as well as the local controller agents operating on the host machines. In some embodiments, the network configuration storage is a database with separate tables updated by different parts of the network control system.

Figure 2:
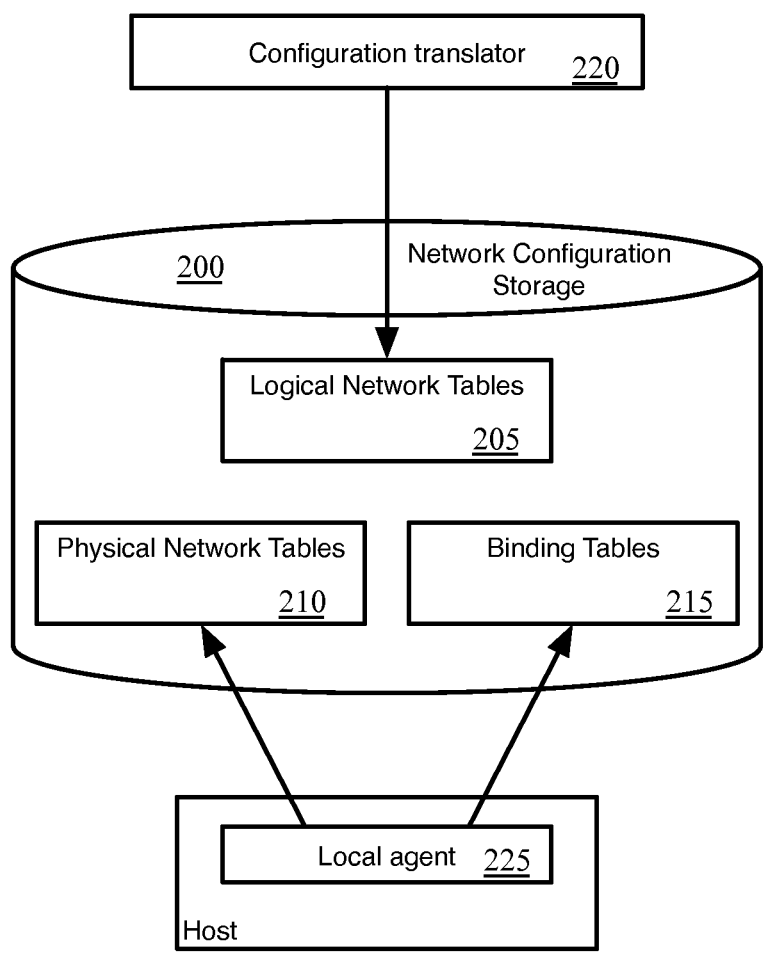
FIG. 2 conceptually illustrates such a network configuration storage of some embodiments.

FIG. 2 conceptually illustrates such a network configuration storage 200 of some embodiments. As shown, the network configuration storage 200 is a database with three sets of tables: logical network tables 205, physical network tables 210, and binding tables 215. As indicated, the logical network tables 205 of some embodiments contain logical datapath flows for the logical forwarding elements of the logical networks to be implemented within the physical network. The physical network tables 210 include information defining the properties of the managed forwarding elements that make up the physical network, including gateway MFEs, and the binding tables 215 include information mapping the logical network to the physical network.

Different tables within the network configuration storage 200 are updated in different manners. As shown, the logical network tables 205 are updated by the configuration translator 220. Described in the previous section, the configuration translator 220 takes as input information describing the logical networks in a standardized format (e.g., tables with rows for each construct) and generates logical flows with match conditions and action, using a Boolean format that allows for succinct description of the flows. This information populates the logical network table.

The physical network tables 210 and the bindings tables 215 are populated by the local agents 225. Though this figure only shows one local agent 225, it should be understood that numerous local agents each populate the physical network tables 210 and bindings tables 215 with their local MFE information. Similarly, the network configuration storage may be a distributed database, stored in numerous locations on several controllers in a cluster (and, in some embodiments, sharded between the different controllers).

The structure of the network configuration storage tables (that is, the database schema used by the database) of some embodiments will now be described. In some embodiments, the physical network tables includes a chassis table that provides a listing of all of the MFEs in the physical network, and which also references two other tables in the network configuration storage: an encapsulations table and a gateway table.

Figure 3:
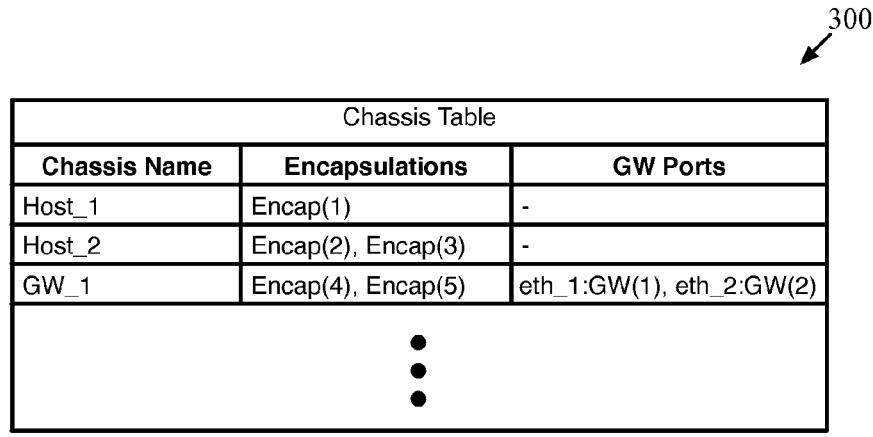
FIG. 3 illustrates the structure of the chassis table of some embodiments.

FIG. 3 illustrates the structure of the chassis table 300 of some embodiments. As shown, each record in the chassis table represents a MFE, which may be either a MFE on a host or a gateway MFE. In some embodiments, the MFEs on hosts operate in the virtualization software (e.g., hypervisor) of a host machine, serving as a first-hop MFE for the data compute nodes (e.g., VMs, containers, etc.) that connect to the logical networks. In some embodiments, some or all of the first-hop MFEs are actually separate physical machines (e.g., as hardware forwarding elements) from the data compute nodes (which may be bare metal machines) for which they are the first-hop MFEs.

As shown, each MFE (or chassis) is defined by its name, its encapsulations, and its gateway ports. The name field is a string in some embodiments, which should be unique within the table. In some embodiments, the name value is retrieved from the MFE configuration data. The encapsulations refer to records in a separate table of encapsulations, shown in FIG. 4. These are the encapsulations supported by the MFE, with the record in the encapsulations table containing the necessary information for other MFEs to use the encapsulation. Lastly, the gateway ports table contains information specifically for gateway MFEs (i.e., that connect the logical network to external physical networks). This field maps gateway ports (e.g., an Ethernet port, an MFE patch port, etc.) on the MFE to a record in a separate gateway table, shown in FIG. 5. These are the gateway ports on the gateway MFE, with the record in the gateway table describing the logical networks to which the gateway port is attached.

Figure 4:
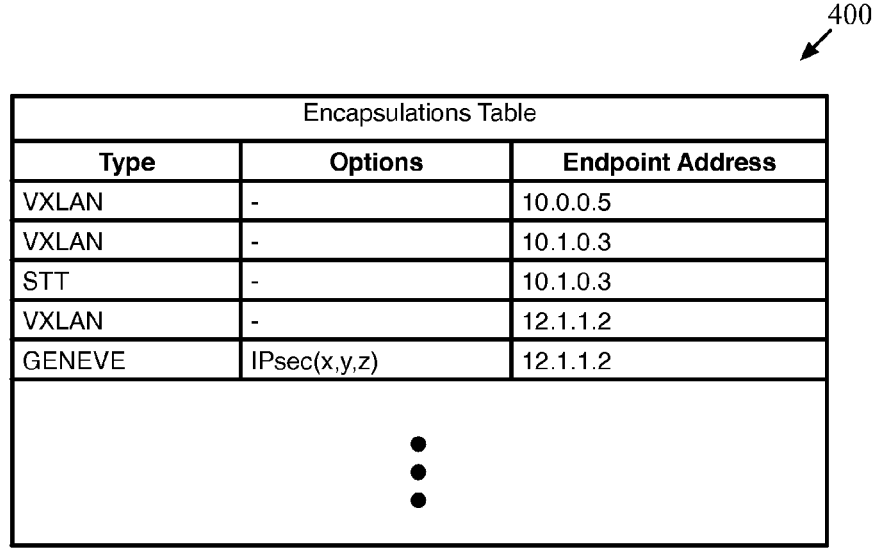
FIG. 4 illustrates the encapsulations table of some embodiments.

FIG. 4 illustrates the aforementioned encapsulations table 400 of some embodiments. In some embodiments, each record in this table represents a tunneling protocol used by a particular MFE. As shown, each record includes a type field that indicates the specific protocol, an options field for specifying additional configurations for the encapsulation, and an endpoint address field that indicates the outer tunnel header IP address to use when encapsulating packets to send to that MFE.

As shown in the figure, the encapsulation type may be VXLAN, STT, GENEVE, or another tunneling protocol. In general, there should be at least one protocol used by all of the MFEs in a network, so that they can all transmit packets to each other without having to find intermediary devices that utilize multiple tunneling protocols. The options field may identify security configurations, such as IPsec parameters, or other optional configurations for a tunnel. Lastly, the endpoint address field specifies the network address to use when addressing particular MFE. In this example, the first encapsulation record (referred to by the MFE Host_1) is a VXLAN encapsulation with the endpoint address 10.0.0.5. The MFE Host_2 supports both VXLAN and STT, both using the same address 10.1.0.3. Lastly, the gateway MFE GW_1 supports both VXLAN and GENEVE, both using the address 12.1.1.2. For the GENEVE protocol, IPsec parameters are also provided.

Figure 5:
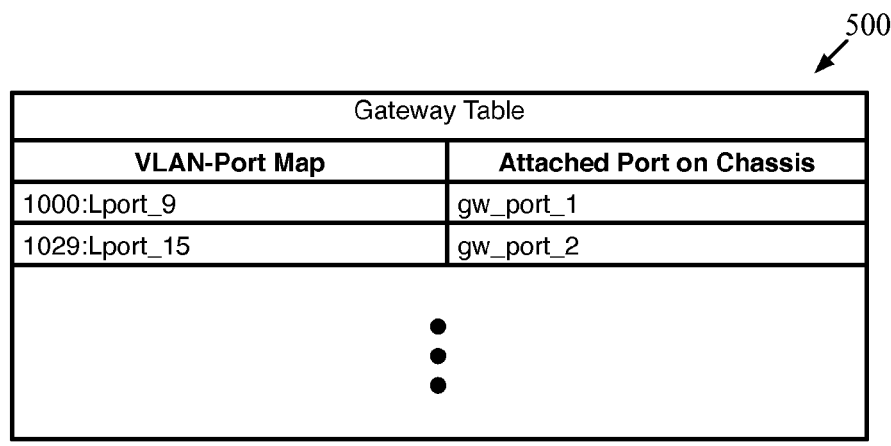
FIG. 5 illustrates the aforementioned gateway table of some embodiments.

FIG. 5 illustrates the aforementioned gateway table 500 of some embodiments.

Each record in the gateway table describes the logical networks to which a gateway port is attached. Because most of the MFEs are not gateways, most local agents do not populate this table. However, the local agents at all of the first-hop MFEs retrieve this information from the network configuration storage in order to instruct their respective MFEs on how to reach the gateways. As shown, the first field in the gateway table is a map from a VLAN identifier to a logical port name, such that each named logical port corresponds to one VLAN on the gateway port. The second field specifies the name of the gateway port on the MFE, thus providing the requisite information (along with the tunnel encapsulation information) for how to reach the gateways.

Figure 6:
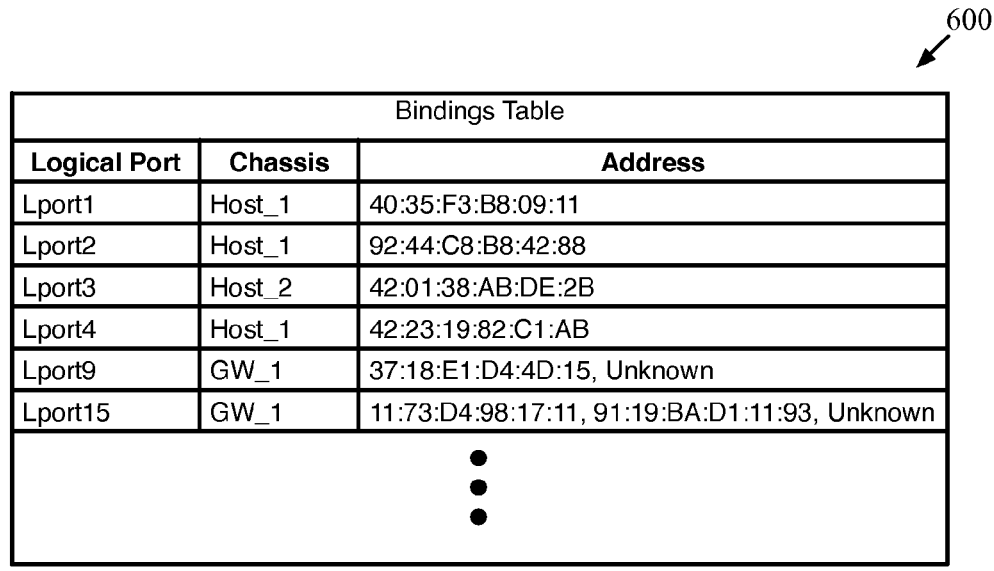
FIG. 6 illustrates the bindings table of some embodiments.

While the previous three tables illustrate the physical network information populated by the local controller agents based on information retrieved from their respective MFEs, FIG. 6 illustrates the bindings table 600 of some embodiments. The binding table, also populated by the local agents, provides the other local agents with the logical network to physical network binding information necessary for populating the forwarding data (e.g., flow entries) of their MFEs. For instance, the logical pipeline information may tell a MFE to which logical port a packet should be forwarded, while the physical network information tells the MFE how to encapsulate the packet to send it to the MFE to which that logical port is bound. However, the binding information is required to make the connection between the logical port and the destination MFE.

As shown, each record in the bindings table includes a logical port field, a chassis (MFE) field, and a set of addresses (e.g., MAC addresses) used as a source address on the logical port. The logical port field must be unique within the table, in some embodiments; that is, the same logical port name (e.g., a UUID) must not be used more than once within all of the logical networks implemented in a particular physical network (e.g., a datacenter, or connected set of datacenters). The MFE field allows for the binding of the logical port to a particular MFE, and is required to match a record in the chassis table (e.g., the table 300). Lastly, the addresses are one or more addresses used as a source address for the logical port. For a typical logical port associated with a VM or other data compute node, the interface would only have a single address. In some embodiments, a gateway port would initially have only the address stand-in unknown, with new addresses added to the set as the gateway learns new source addresses. Thus, the records for Lport1 -Lpor4, which are each present on one of the two first-hop MFEs Host_1 and Host_2, each have one associated MAC address. The gateway logical ports Lport9 and Lport15, however, may have multiple associated source addresses.

Figure 7:
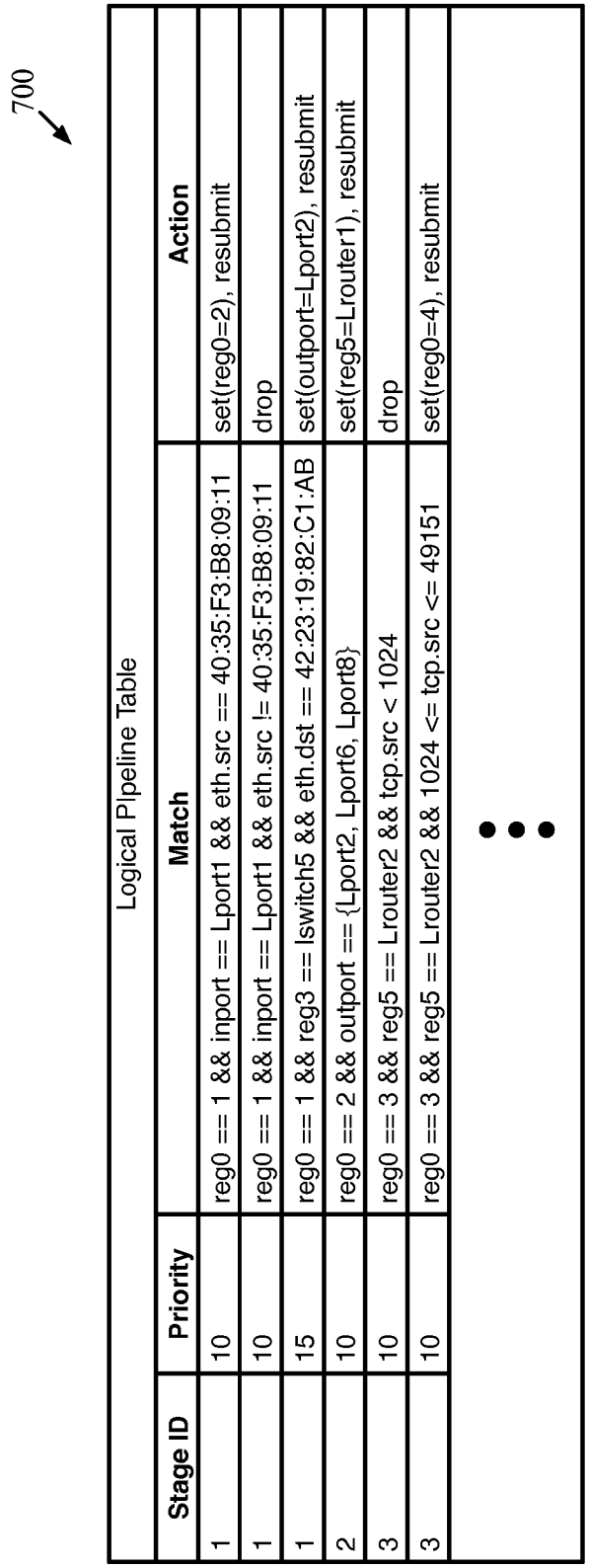
FIG. 7 illustrates an example of the logical pipeline table of some embodiments.

Lastly, FIG. 7 illustrates an example of the logical pipeline table 700 of some embodiments. The logical pipeline table represents the logical network structure and rules (e.g., ACL rules) in terms of logical flows. Each record in the logical pipeline table 700 represents a single logical flow, which may be representative of multiple flow entries as used in the MFE. Whereas the above tables are populated by the local agents based on data from the MFEs, the logical pipeline table is populated by the configuration translator (i.e., the centralized network controller) based on the logical network specifications defined by users through the management systems. The local agents can then use these logical pipeline table records to generate forwarding data (e.g., OpenFlow flow entries) useable by their respective MFEs.

As shown, each record in the pipeline table includes a stage identifier (or table identifier), a priority value, a set of match conditions, and a set of actions. The stage identifier enumerates a stage in the logical pipeline, which may be analogous to a flow table number used by the MFE. Thus, for example, ingress ACL entries will have stage numbers after ingress context mapping but before logical forwarding, while egress ACL entries will have stage number after the logical forwarding. The priority value identifies the priority of the flow entry, which comes into play when a packet can match multiple flows in the same stage. When a packet matches multiple flows, the higher priority flow takes precedence. Some embodiments use a standard value for standard flow entries in a table, but use lower priorities for automatically added default flows as well as allowing the user to specify priorities when defining the logical network.

The match conditions use a syntax of Boolean expressions and relational operators, in some embodiments. For MFEs that use OpenFlow flow entries, the match conditions in the pipeline table provide a superset of OpenFlow matching capabilities, thereby shrinking the size of the table compared by compressing multiple flow entries into single match conditions. Each matching expression, in some embodiments, includes a field or a subfield and its required relation to a constant value. The fields allowed by some embodiments may include, possibly among other fields:
  a set of metadata and/or register fields (which may be used for processing internal to an MFE, such as to store logical forwarding element and logical port values, stage values, etc.0, physical
  physical properties of the MFE, such as inport, outport, and queue
  Ethernet header fields, such as source/destination addresses as well as Ethertype
  VLAN fields, including VLAN id, tag control information, priority code point, and whether or not a VLAN tag is present
  IP header fields, including source/destination addresses (for both IPv4 and IPv6), IPv6 labels, transport layer protocol, time to live, fragmentation information, differentiated services information, and congestion notification information ARP header fields, including the opcode, source and target IP addresses, and source and target MAC addresses TCP, UDP, and SCTP source and destination ports, as well as TCP flags ICMPv4 and ICMPv6 header fields, including type and code values IPv6 neighbor discovery fields In some embodiments, the expressions may match against sub-fields rather than the whole field, by specifying specific bits of a field. For instance, to match against only the 8 least significant bits of the IPv4 source address (i.e., the fourth octet, or "z" of an address as formatted w.x.y.z), a match expression would use IPv4.src[0 . . . 7] in some embodiments. In addition, some embodiments use prerequisites when generating the match expressions, which the configuration translator automatically adds when generating the logical pipeline table records. As an example, a match over an ARP field requires that the packet actually be an ARP packet (as specified by the Ethertype field), and thus a match expression over the arp.op field will automatically combine that with the expression eth.type==0x0806. Similarly, IP address matches require eth.type==0x0800, while TCP header field matches require ip.proto==6 as well as (eth.type==0x0800||eth.type==0x86dd). In some embodiments, the constant values to which the field values are related by the expressions may be in decimal integer form, hexadecimal form, standard addressing forms (e.g., for MAC and/or IP addresses), etc. In addition, masked values may be followed by a slash and then a second value for a mask (e.g., for IP addresses in CIDR notation).

For the operators in the matching notation, some embodiments use standard parentheses "( )" for grouping. The equality/inequality operators include the equality operator (==), not equal operator (!=), as well as the four inequality operators (<, <=, >, >=). The logical not operator (!), as well as logical and and or operators (&&, ||) may also be used.

The equality operator (==), between a field and a constant value, requires the field (or sub-field) to exactly match the constant value in order for a match to exist. In addition, brackets "{ }" may be used to denote sets of constant values, such as eth.src=={A, B, C}, which requires that the source Ethernet address equal one of A, B, and C, in order for a packet to match the condition. This allows logical flows that would otherwise require multiple separate flow entries (e.g., three entries in the above example) to be represented as a single record in the pipeline table. Similarly, the not equal operator may be used with a set of values, such as eth.dst !={D, E, F}. This requires that the destination Ethernet address be not equal to D, not equal to E, and not equal to F.

The inequality operators may be used to define a range of possible values, such as requiring that a TCP port be less than a particular value (e.g., tcp.src<=1024), or fit within a specific range (e.g., 100<tcp.dst<125). These operators may be expensive to use in terms of translating to flow entries for the MFE, however, as some embodiments do not recognize ranges of values. Thus, the expression 100<tcp.dst<125 will result in twenty-four separate flow entries for each MFE that implements the logical flow, unless bitmasking can be used to simplify the number of entries (e.g., the expression tcp.src<=128 can also be represented by ensuring that all bits after the first eight bits of the TCP source port are 0).

The action field of each record in the logical pipeline table 700 provides the actions for a MFE to take when the corresponding match conditions of the record are met by a packet. These actions may include setting a value for a field (using the expression set(field=value)), dropping a packet, outputting a packet to a port, broadcasting a packet to every port on a logical switch (except the logical ingress port), and resubmitting the packet to execute the next stage in the logical pipeline. Some embodiments may include additional actions, such as learning actions (which create additional new flow entries), sending a packet to a connection tracker, decrementing the time to live (which can also be implemented using set(ttl=ttl−1), generating an ICMP reply or an ARP packet, etc.

The logical pipeline table 700 in FIG. 7 includes examples of several types of match conditions and actions, and Section IV below further illustrates the generation of such table records and subsequent conversion into flow entries by the local controller agent. As shown, all of the records in this example include a match over a reg0, which may be used as a stage register to indicate the processing pipeline stage. In some embodiments, this information is not included in the match field of the logical pipeline table record, but is instead added by the local controller agent when generating the flow entries for the MFE. The first two records specify that if the packet has been assigned a logical egress port of Lport1 then its source MAC address must equal 40:35:F3:B8:09:11. In this case, the first record indicates to advance to the next stage, and resubmit. On the other hand, if the source MAC address is anything else, the packet must be dropped. The third record specifies the same stage but a different priority (and could be a flow for a completely different logical network), and requires that reg3 equal a particular logical switch ID lswitch5 (e.g., the packet must have been assigned to this logical switch), and that the destination MAC address equal 42:23:19:82:C1:AB. This is a logical forwarding flow, and thus the actions specify to set the outport to a logical switch port ID Lport2 , and resubmit the packet.

The next example matches over the outport field, and if the outport field is set to any of three UUIDs (e.g., for logical switch ports) Lport2 , Lport6 , or Lport8 , then a register field reg5 is set to equal the UUID Lrouter1 for a particular logical router, along with a resubmit action. In this way, three different logical flows for different logical switches that connect to the same logical router may be aggregated into a single entry, as they all result in the same actions. Finally, the last two sets of flows combine to use inequality operators to drop all packets on a particular logical router with a TCP source port less than 1024 and keep all packets with a TCP source port from 1024 to 49151, inclusive. As will be shown further below, a multitude of different types of flows are possible using the Boolean match expression syntax of some embodiments.

III. Local Controller Agent Operation

Figure 8:
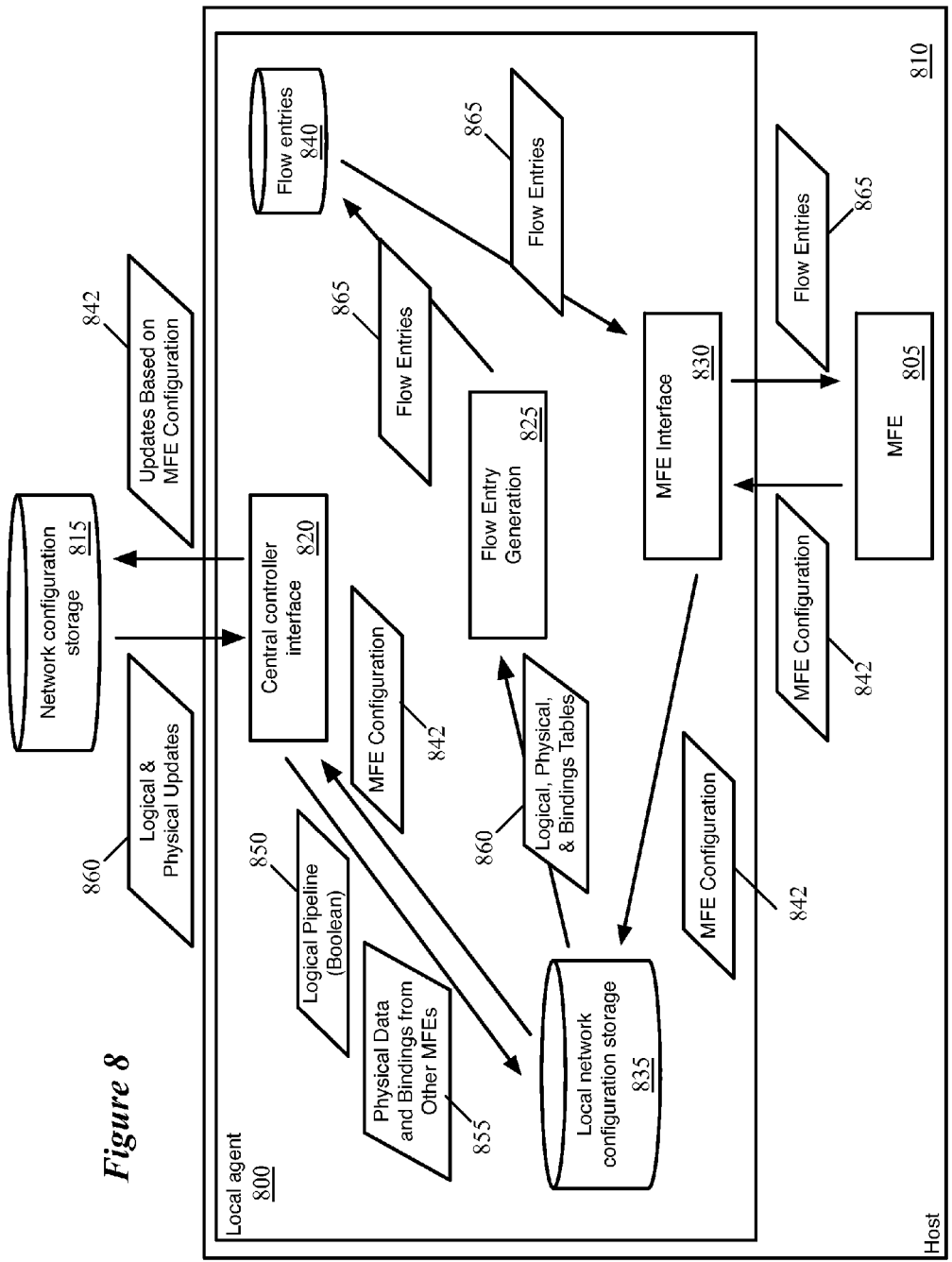
FIG. 8 conceptually illustrates the architecture of a local controller agent of some embodiments, showing the flow of data between this local agent, its local flow-based MFE on a host machine, and the network configuration storage.

While the centralized controller or controllers are responsible for translating logical network specification input into flows, the local controller agents that operate alongside the MFEs are responsible for (i) populating the physical network and binding information in the central storage, (ii) retrieving the logical, physical, and binding information stored in the centralized network configuration storage, and (iii) generating forwarding data for use by their respective MFEs. FIG. 8 conceptually illustrates the architecture of a local controller agent 800 of some embodiments, showing the flow of data between this local agent 800, its local flow-based MFE 805 on a host machine 810, and the network configuration storage 815.

As shown, the local controller agent 800 includes a central controller interface 820, a flow entry generation module 825, and a MFE interface 830. The central controller interface 820 allows the local agent 800 to communicate with the central controller, and specifically to exchange data with the network configuration storage 815 (both populating the physical network and binding tables based on the configuration of the MFE 805 and receiving logical network, physical network, and binding table data from the network configuration storage). In different embodiments, this communication may be through a remote procedure call (RPC) channel or other protocol (e.g., NETCPA, etc.).

The MFE interface 830 allows the local agent 800 to communicate with the MFE 805. In some embodiments, when the MFE 805 is Open vSwitch or a similar flow-based software forwarding element, the MFE interface 830 is actually two separate interfaces, one for providing flow entries to the MFE (e.g., an OpenFlow interface) and one for providing configuration data to the MFE and reading configuration data setup by the MFE (e.g., an OVSDB interface). Though not shown in this figure, in some embodiments both the local agent 800 and the MFE 805 operate within the virtualization software (e.g., hypervisor) of the host machine 810, which also hosts one or more virtual machines or other data compute nodes (e.g., containers operating directly on the host or in a virtual machine hosted on the host). In other embodiments, the data compute nodes for which the MFE is a first-hop forwarding element operate on a separate physical host machine, or are themselves separate bare metal machines.

The local controller agent 800 includes two storages, in some embodiments, a local network configuration storage 835 and a flow entries storage 840. The local network configuration storage stores the database tables also stored in the centralized controller's network configuration storage 815, or at least a subset of these, while the flow entry storage 840 stores flow entries or other forwarding data for use by the MFE, which are calculated by the local agent 800 based on the various tables. That is, the network configuration database tables (the logical network, physical network, and bindings tables) are the inputs for the flow entry calculation by the generation module 825, and the flow entries stored in the storage 840 are the outputs of this calculation.

The flow entry generation module 825 is responsible for translating the physical network, logical network, and bindings tables retrieved from the network configuration storage 815 (and stored in the local network configuration storage 835) into flow entries that can be provided to the MFE 805. In some embodiments, this module translates the Boolean expression syntax of the logical network tables into flow entries in a standardized format (e.g., OpenFlow entries) according to a set of rules. In addition, the set of rules for flow entry generation specify how to generate flow entries using the physical network and binding data (e.g., for mapping physical ingress ports to logical ingress ports, mapping logical egress ports to physical destinations, and for performing tunnel encapsulations).

The data flow through the local controller agent 800 will now be described. When the configuration of the MFE 805 changes, this new data 842 is read by the MFE interface 820 and stored in the local network configuration tables 835 (i.e., in the physical network and binding tables). For instance, when a new VM is created on the host machine 810 and attached to the MFE, that host machine will have an associated logical port. The MFE interface 830 reads this information from the MFE 805, and updates the binding table in its local network configuration tables 805, in addition to creating the required flow entries for mapping packets received from the interface and sent to the logical port. Similarly, the tunnel information for the MFE (its tunnel endpoint address(es) and supported tunnel protocols) are read by the MFE interface 830.

This MFE configuration information 842 is sent by the central controller interface 820 to the network configuration storage 815, and stored in the appropriate tables (e.g., the chassis, encapsulation, and gateway tables) of the network configuration storage 815. Similar information is stored in these tables by the corresponding local controller agents on the other host machines of the network (both first-hop MFEs as well as gateway MFEs). When a MFE is powered on, its basic information is read to populate the chassis table (as well as the encapsulation and gateway tables). Then, as VMs (or other data compute nodes) are added and removed from connecting to the MFE, the local controller agent reads these changes and populates or removes records from the binding table. When a MFE is gracefully shut down (as opposed to suddenly crashing or being cut off), the local controller agent removes the records for all of the relevant data compute nodes from the binding table, in addition to removing the MFE's records from the physical network (chassis, gateway, and encapsulation) tables.

The local controller agent 800 also, through its local controller interface 820, receives updates 845 from the network configuration storage 815. These updates include both logical pipeline flows 850 generated by the network controller from logical network descriptions, as well as the physical network and binding table data 855 populated by other local controllers for other MFEs. In some embodiments, all of the physical network data for the network is pushed to the local agent 800 (or pulled by the local agent), because this information is relatively small (it increases linearly with the number of MFEs in the network) and does not change often. The binding data and logical network data changes much more quickly and will generally be much larger than the physical network data because it scales with the number of logical ports, so in some embodiments a local controller agent only receives (or pulls) the data for the logical networks that its MFE needs to implement (i.e., the logical networks to which its local data compute nodes are connected).

Both the logical network data generated by the network controllers as well as the physical network and binding data from the other MFEs as well as the local MFE 805 is stored in the local network configuration tables 835, and fed as input data 860 to the flow entry generation module 825. The flow entry generation module translates this information into output flow entries 865, including logical network flow entries, physical-to-logical and logical-to-physical port binding flow entries, and tunnel encapsulation flow entries. These flow entries 865 are stored in the flow entry storage 840, and provided via the MFE interface 830 to the MFE 805. The MFE can then use the flow entries to forward packets according to the configured logical networks and send these packets through the physical network via tunnels.

Figure 9:
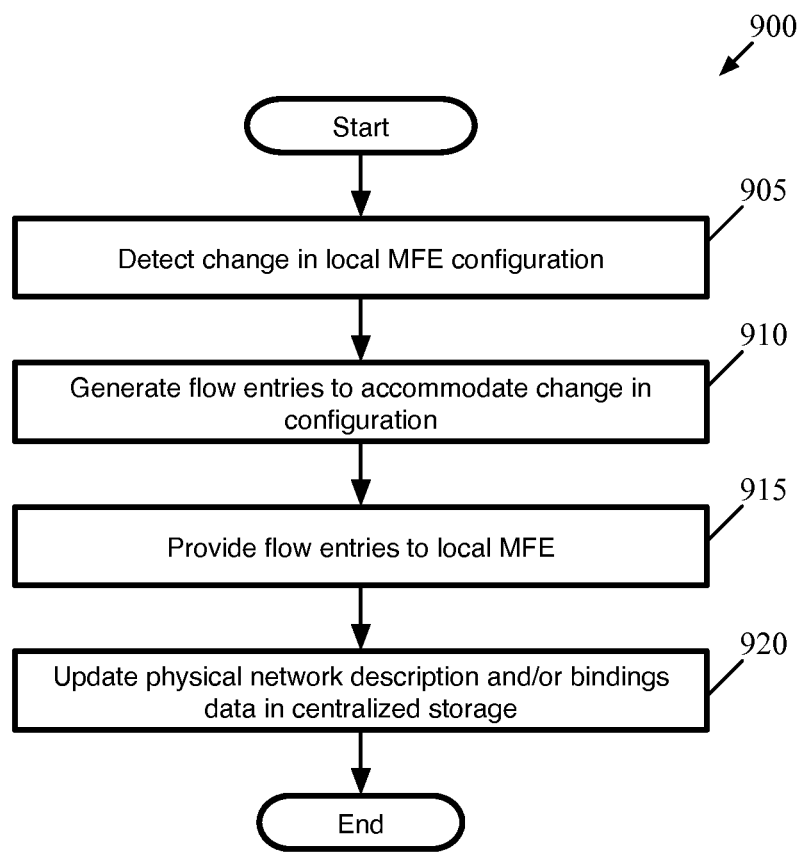
FIG. 9 conceptually illustrates a process of some embodiments for handling changes in the local MFE configuration.

FIG. 9 conceptually illustrates a process 900 of some embodiments for handling changes in the local MFE configuration. The process 900 is performed by the local controller agent of some embodiments (e.g., local agent 800). As shown, the process 900 begins by detecting (at 905) a change in the local MFE configuration. For instance, this could be the addition or removal of an interface on the MFE (due to the addition or removal of a data compute node connecting to the MFE. This might also be a change in the encapsulation settings of the MFE (a less common event), the learning of new source addresses for a gateway port, etc.

The process 900 then generates (at 910) flow entries to accommodate the change in the configuration. In some cases, rather than generating new flow entries, the process instead removes flow entries (e.g., when a data compute node, and thus virtual interface, is removed from connecting to the local MFE). When a new interface is added, the local controller agent generates a flow entry for mapping packets received through that physical interface to the corresponding logical ingress port, and for mapping packets sent to the logical port (as an egress port) to the physical interface. The process also provides (at 915) these flow entries to the MFE.

In addition, the process 900 updates (at 92) the physical network description and/or bindings data in the centralized storage based on this information. In the example of an added interface, a record is added to the bindings table at the central controller. Similarly, if an interface is removed, then the controller agent removes its bindings table record, so that other controller agents can detect this data and instruct their MFEs to cease sending packets addressed to that logical port to the local MFE.

IV. Logical Network Data Conversion

As noted above, the logical network data is translated by the central controller of some embodiments from a logical network description (e.g., descriptions of logical forwarding elements, logical ports, and ACL rules) into a set of logical flows using a Boolean and relational operator syntax for the matching expressions, and then from this syntax into a set of flow entries readable by a MFE (e.g., valid OpenFlow flow entries).

Figure 10:
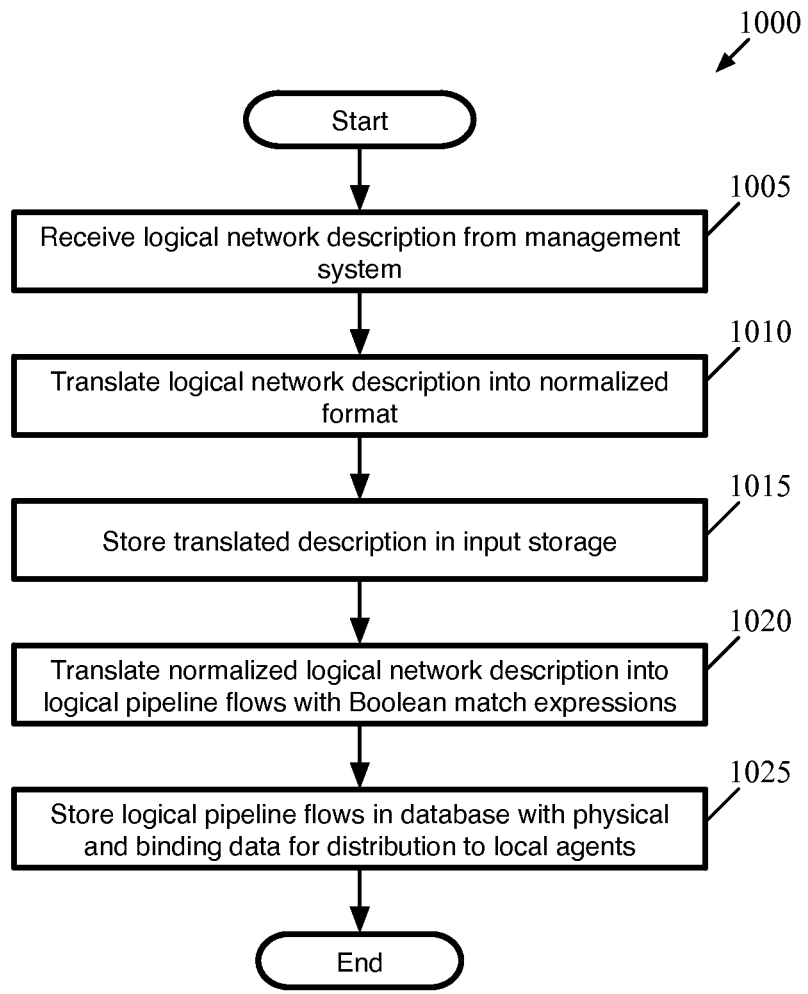
FIG. 10 conceptually illustrates a process of some embodiments for receiving data from a management system and generating logical flows using Boolean and relational operator syntax for the matching expressions.

FIG. 10 conceptually illustrates a process 1000 of some embodiments for receiving data from a management system and generating logical flows using Boolean and relational operator syntax for the matching expressions. In some embodiments, the process 1000 is performed by a centralized network controller (e.g., a controller in a cluster). In some embodiments, different portions of the process 1000 may be performed by different modules within a network controller, and even by different controllers within a cluster. For example, a first controller might receive the logical network description via a management system interface plug-in, and store this in a first database that is shared between the controllers within the cluster. A second network controller in the cluster then performs the translation of this logical network description into the logical flows for distribution to the local controller agents. FIG. 10 will be described in part by reference to FIG. 11, which illustrates a portion of a logical network description 1100 and the logical flow entries generated based on this network description.

Figure 11:
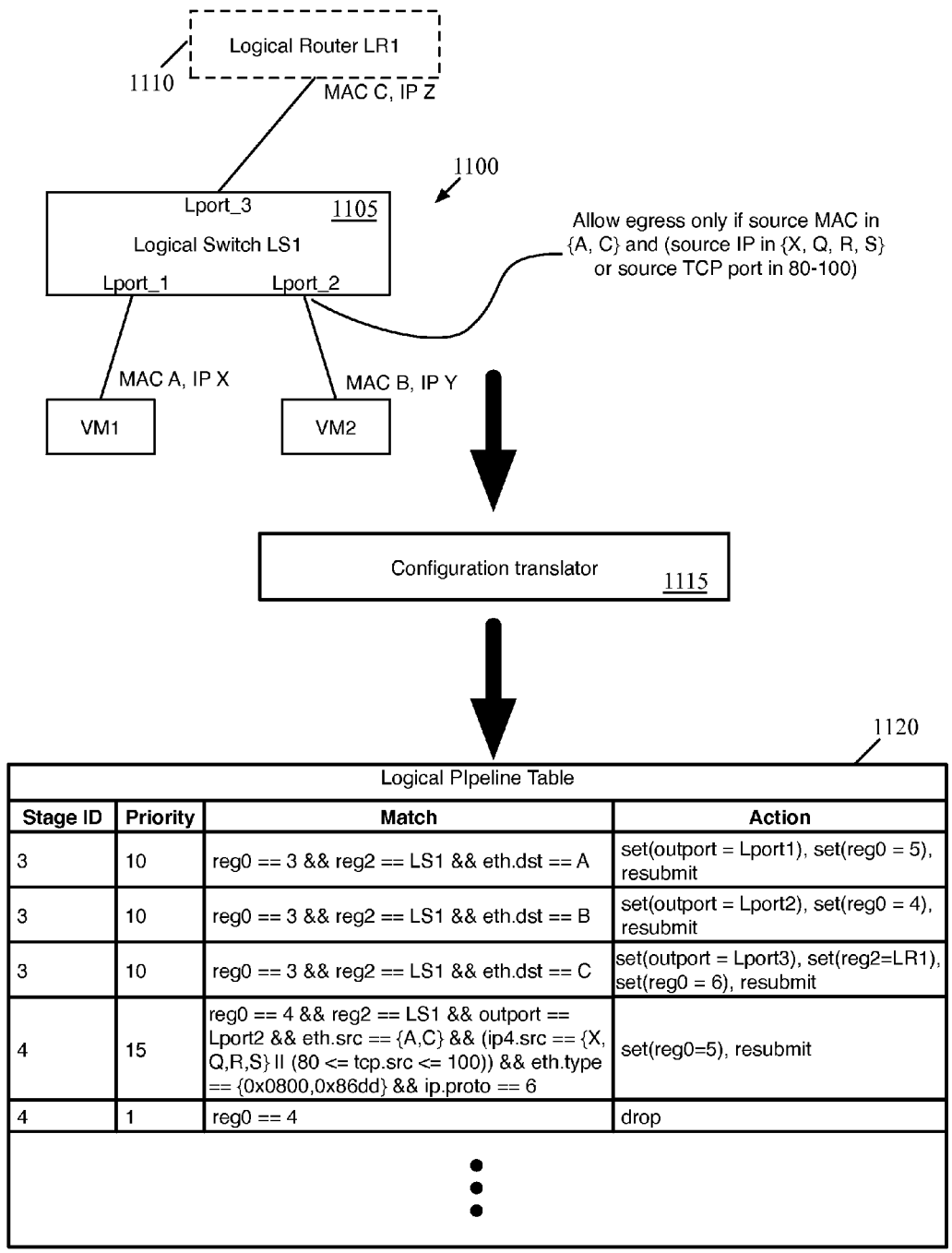
FIG. 11 illustrates a portion of a logical network description and the logical flow entries generated based on this network description.

As shown, the process 1000 begins by receiving (at 1005) a logical network description from a management system (e.g., a cloud management system). In some embodiments, the network controller receives this information through a plug-in interface designed specifically for the particular management system (e.g., a Neutron plug-in for Open-Stack). FIG. 11 illustrates as input a graphical view of a portion of a logical network description 1100 of some embodiments. Specifically, the logical network description 1100 shows a logical switch 1105 with three logical ports, two of which connect to VMs (VM1 and VM2) and one of which connects to a logical router 1110. These logical ports are Lport_1 connecting to VM1, which has a MAC address A and an IP address X, and Lport_2 connecting to VM2, which has a MAC address B and an IP address Y. The third logical port Lport_3 connects to an interface of the logical router 1110 that has a MAC address C and IP address Z. Finally, an ACL rule is defined for the logical port Lport_2. This ACL rule specifies to only allow packets to egress through Lport_2 if the packet has a source MAC address A or C, and either a source IP address X, Q, R, or S or a source TCP port in the range 80-100, inclusive. This example is meant to be illustrative of the possibilities that can be expressed in a single logical flow, and is not necessarily meant to be representative of a likely ACL rule.

Returning to FIG. 10, the process 1000 translates (at 1010) the logical network description into a normalized format, and stores (at 1015) this translated description in an input storage at the centralized controller (e.g., the configuration input storage 130 of FIG. 1). This input storage is a database, in some embodiments, that stores the logical network information in an intermediate, normalized format. That is, the format is the same irrespective of the management system from which the logical network description was originally received. In some embodiments, this database includes a logical switch table, a logical switch ports table, a logical router table, a logical router ports table, and an ACL table. The logical switch and logical router tables allow the users to define the structure of their logical networks, by defining the logical forwarding elements and assigning ports and ACL rules to those logical forwarding elements. The logical switch port and logical router port tables store the properties of each logical port in the logical networks, including addresses assigned to the port, what the port connects to (e.g., a logical switch or router, a VM, etc.), and other port information. Similarly, the ACL table stores the definition for each ACL rule, including the port(s) to which it applies, whether the rule applies to packets ingressing from or egressing through the port(s), and whether packets that match the rule should be dropped, allowed, etc. In the example of FIG. 11, this intermediate format is not shown, but would include a description of logical switch LS1 1105 in the logical switch table, three logical port descriptions for Lport_1, Lport_2, and Lport_3 in the logical port table, and the ACL rule in the ACL table.

Next, the process 1000 translates (at 1020) this normalized logical network description into logical pipeline flows with Boolean match expressions, and stores (at 1025) the logical pipeline flows in a configuration database along with physical and binding data for distribution to the local controller agents. The process 1000 then ends. This operation may be performed by the configuration translator of a network controller (e.g., the configuration translator 125) of FIG. 1, and stored in the distributed network configuration storage that is populated by both the local controller agents (for the physical and binding data) and the network controller (for the logical network data).

FIG. 11 illustrates a configuration translator 1115 and its output, as it relates to the logical switch 1105. As shown, the configuration translator generates logical flow records to store in the logical pipeline table 1120. The first three of these logical flow records are for logical forwarding at the logical switch layer. Specifically, each of these logical flow records sets a match condition that reg0 (being used as a stage register) be equal to 3 (the current stage), that reg2 be equal to LS1 (the UUID for the logical switch, indicating that the packet has been associated with this logical switch), and a different match over the destination MAC address field. For the match conditions eth.dst==A, the actions specify to set the logical output port as Lport1 (which is associated with MAC address A), to set the stage register reg0 to 5 (skipping stage 4, which as will be shown is used for the egress ACL), and resubmit the packet. For the match condition eth.dst==B, the actions specify to set the logical output port as Lport2, to set the stage register reg0 to 4 (in order to perform egress ACL processing), and resubmit the packet. Lastly, for the match condition eth.dst==C, the actions specify to set the logical output port as Lport3, to set the register reg2 to LR1 (indicating that the packet will now be logically sent to the logical router LR1, out of the logical switch LS1), to set the stage register reg0 to 6 (to skip the rest of logical switch processing), and resubmit the packet.

The logical pipeline table 1120 also includes flows to handle the ACL rule set for packets egressing Lport2 of the logical switch 1105. Because of the various groupings of multiple allowed addresses and ports per variable, this will require numerous flow entries for the MFE (as described below). However, the Boolean and relational operator expression logic used for the logical pipeline table allows for the ACL matching rule to be expressed in a single record. Specifically, this record includes a match over the stage register (reg0==4), conjoined with (&&) a match over the logical forwarding element register (reg2==LS1), conjoined with (&&) a match over the output port (outport==Lport2), conjoined with (&&) a match over a set of allowable source MAC addresses (eth.src={A, C}), conjoined with (&&) a match over either a set of allowable source IP addresses (ip.src={X, Q, R, S} or (||) a range of allowable TCP source ports (80<=tcp.src<=100), and finally conjoined with (&&) prerequisite match conditions added to ensure that the IP and TCP match conditions are valid (eth.type={0x0800, 0x86dd} && ip.proto==6). This allows the requirements to be succinctly captured in a single record in the logical pipeline table. As shown, the actions specify that if these conditions are met, the stage register is advanced and the packet is resubmitted. In addition, some embodiments add a default flow record for packets that do not pass the egress ACL entries. This last record is a low priority flow for the stage, indicating to drop the packet.

It should be understood that these logical flows are merely examples, and different embodiments may include variations on the flow records, as well as different or additional flow records. For instance, in some embodiments a record specifying that if the inport is any of Lport1, Lport2, or Lport3, then the packet is assigned to logical switch LS1 (e.g., using the register reg2).

Figure 12:
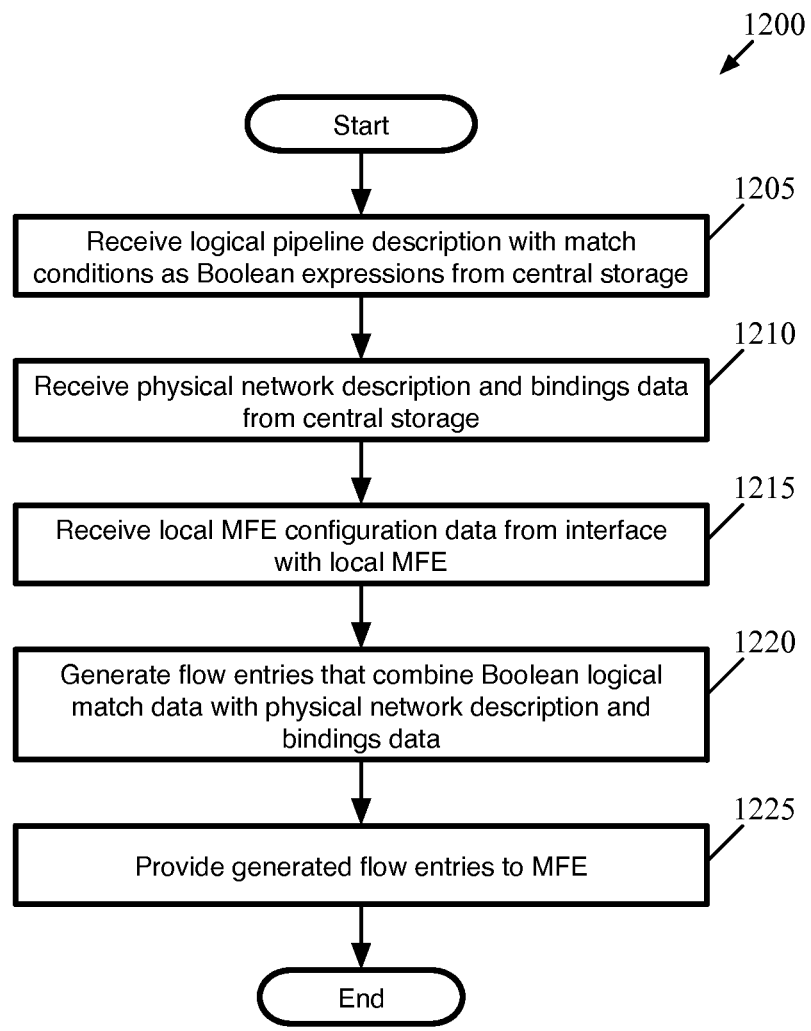
FIG. 12 conceptually illustrates a process of some embodiments for generating flow entries from the received tables.

The logical pipeline table is, as mentioned, distributed to the local agents (along with the binding tables and physical network tables populated by the other local agents), which use the received records to generate flow entries (or other forwarding data) for their respective MFEs. FIG. 12 conceptually illustrates a process 1200 of some embodiments for generating flow entries from the received tables. The process 1200 is performed by the local controller agents in some embodiments, whenever new data is received by a local agent that requires updates to the flow entries for its MFE. FIG. 12 will be described in part by reference to FIG. 13, which illustrates the conversion of the records from the logical pipeline table 1120 into flow entries readable by a MFE.

As shown, the process 1200 begins by receiving (at 1205) the logical pipeline description data with match conditions as Boolean expressions from the central storage. The process also receives (1210) physical network description and bindings data from the central storage. Furthermore, the process receives (at 1215) the local MFE configuration through its interface with the MFE. As described above by reference to FIG. 8, these three sets of data may not be received in the order shown here. In fact some embodiments process updates as they are received, so at any particular time the local agent may be computing flow entries for only a particular type of data (e.g., new logical network and binding information, a new MFE that has been added to the physical network, or updating binding information when a VM migrates).

Figure 13:
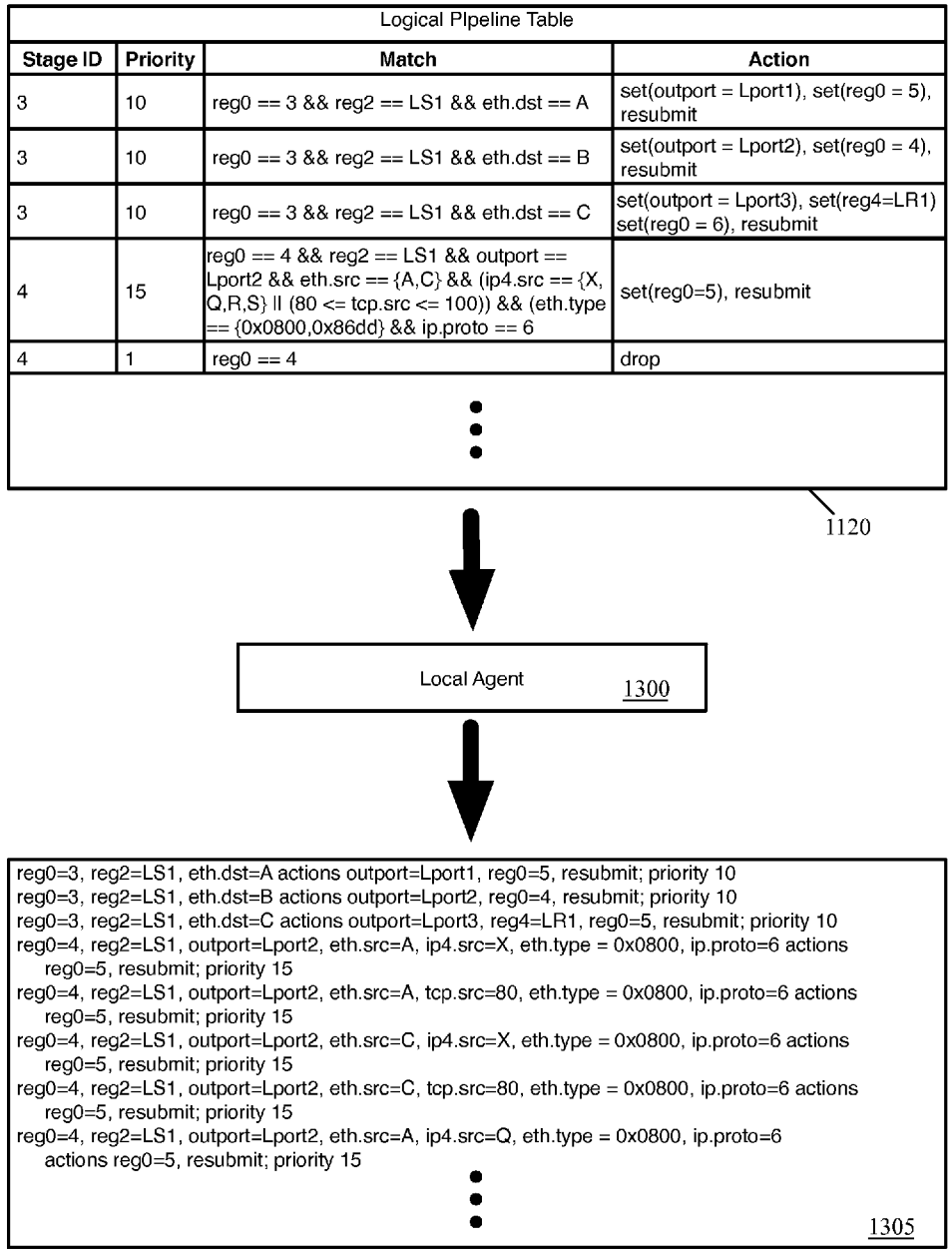
FIG. 13 illustrates the conversion of the records from the logical pipeline table into flow entries readable by a MFE.

In some embodiments, each controller agent only receives the logical flow records for the logical networks that their local MFE implements (i.e., the logical networks to which the local data compute nodes are logically connected). In the example of FIG. 13, the local agent 1300 receives the logical pipeline table records 1120 that relate to the logical switch 1105, which were described above by reference to FIG. 11. The local agent 1300 is a local controller agent, similar to that shown in FIG. 8.

The process then generates (at 1220) flow entries that combine the Boolean logical match data with the physical network description and bindings data. The process then provides (at 1225) these flow entries to the local MFE. For instance, the logical flow entries in the pipeline table may be turned into multiple flow entries for an MFE. In addition, the bindings information is used to generate flow entries that integrate the logical flow entries with the physical network information, and the physical network data is used to generate the proper encapsulation flow entries for packets sent to particular other MFEs based on the logical network and bindings data.

FIG. 13 illustrates a subset of the flow entries 1305 generated for an MFE by the local agent 1300 based on the logical flow records in the pipeline table 1120. The first three records translate easily into flow entries for the MFE. These three entries match over the stage register reg0, the logical switch register reg2, and the destination MAC address. Their actions specify, as in the flow record of the pipeline table, to set the logical egress port (outport) to the corresponding logical port for the destination MAC address, advance the stage register to the appropriate stage, and resubmit the packet.

The next flow entries illustrate a subset of the entries required for the ACL rule expressed in a single flow record. Because the match allows multiple possible values for a single field, this flow record must be expressed as multiple flow entries for the MFE in some embodiments, as the hash tables used for performing the match lookups do not permit such options in a single entry. In addition, multiple flow entries are required due to the presence of an "OR" operator (||), as such a match may not be expressed in a single flow for an MFE using hash table lookups of some embodiments. Thus, the first flow entry matches on a single value for each field, except the tcp.src field, while the second flow entry has the same match conditions except for a match on a single tcp.src value instead of the ip.src match. Collectively these two flow entries allow packets with a source MAC address of A and either a source IP address of X or a source TCP port value of 80. Similarly, the next two flow entries allow packets with a source MAC address of C and either a source IP address of X or a source TCP port value of 80. The last flow entry shown allows packets with a source MAC address of A and either a source IP address of Q; in this manner flow entries for all of the possible MAC address:IP address pairings and MAC address:TCP source port pairings will be generated and provided to the MFE.

This results in 2×25 flow entries (2 MAC addresses multiplied by (21 TCP ports plus 4 IP addresses)), with another multiplier (×2) for the Ethertype field, resulting in 100 different flow entries based on the single flow record. Some embodiments use conjunctive match flow entries to reduce this number, as described in greater detail in U.S. patent application Ser. No. 14/815,896, filed Jul. 31, 2015, now published as U.S. Patent Publication 2017/0034049, which is incorporated herein by reference. In that case, 2+2+25 (+1) flow entries would be needed for the MFE.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 14 conceptually illustrates an electronic system 1400 with which some embodiments of the invention are implemented. The electronic system 1400 can be used to execute any of the control, virtualization, or operating system applications described above. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 9, 10, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a controller agent executing on a particular host computer with a local managed forwarding element (MFE) that implements a logical network along with a plurality of other MFEs in a physical network, a method comprising:
   receiving, from a centralized controller that manages the MFEs and connects to a plurality of other controller agents executing with the other MFEs on a plurality of other host computers, (i) a first description of the physical network, (ii) a description of the logical network, and (iii) a first set of bindings between the logical and physical network, wherein the first description of the physical network and the first set of bindings are provided to the centralized controller by a set of the controller agents executing on a set of the other host computers, and the description of the logical network is provided to the centralized controller by an operator of the logical network;
   receiving, from the local MFE executing on the particular host computer, second description of the physical network relating to the local MFE and a second set of bindings between the logical and physical network for machines connected directly to the local MFE;
   providing to the centralized controller the second description of the physical network and the second set of bindings for distribution to the plurality of other controller agents in the plurality of other host computers;
   generating forwarding data for the local MFE using (i) the first description of the physical network, the description of the logical network, and the first set of bindings received from the centralized controller and (ii) the second description of the physical network and the second set of bindings received from the local MFE; and
   providing the generated forwarding data to the local MFE to forward data messages in the logical network.

2. The method of claim 1, wherein the first description of the physical network comprises properties of a set of other MFEs executing on the other host computers.

3. The method of claim 2, wherein the properties of the set of other MFEs comprises encapsulation information for tunneling packets to the other MFEs.

4. The method of claim 1, wherein the first description of the physical network comprises a table with records for each of the MFEs, a table with records for each tunneling protocol used by an MFE, and a table with records for each gateway port of a subset of the MFEs that join the logical network to external physical networks.

5. The method of claim 1, wherein the description of the logical network comprises a table with logical flow records generated by the centralized controller based on logical network descriptions received from the operator of the logical network using one or more management systems.

6. The method of claim 1, wherein the first set of bindings comprises a table with records for each logical port specifying a location in the physical network to which the logical port maps.

7. The method of claim 6, wherein the location in the physical network comprises a particular MFE for each logical port.

8. The method of claim 1, wherein the controller agent and the local MFE are part of the virtualization software of the particular host computer, wherein the data compute nodes on the particular host computer execute on top of the virtualization software.

9. The method of claim 8, wherein the data compute nodes logically connect to the logical network.

10. The method of claim 1, wherein the local MFE is a flow-based MFE, wherein the generated forwarding data comprises flow entries.

11. A non-transitory machine readable medium storing a controller agent for execution by at least one processing unit of a particular host computer, wherein a local managed forwarding element (MFE) that implements a logical network along with a plurality of other MFEs in a physical network also executes on the particular host computer, the controller agent comprising sets of instructions for:
- receiving, from a centralized controller that manages the MFEs and connects to a plurality of other controller agents executing with the other MFEs on a plurality of other host computers, (i) a first description of the physical network, (ii) a description of the logical network, and (iii) a first set of bindings between the logical and physical network, wherein the first description of the physical network and the first set of bindings are provided to the centralized controller by a set of the controller agents executing on a set of the other host computers, and the description of the logical network is provided to the centralized controller by an operator of the logical network;
- receiving, from the local MFE executing on the particular host computer, a second description of the physical network relating to the local MFE and a second set of bindings between the logical and physical network for machines connected directly to the local MFE;
- providing to the centralized controller the second description of the physical network and the second set of bindings for distribution to the plurality of other controller agents in the plurality of other host computers;
- generating forwarding data for the local MFE using (i) the first description of the physical network, the description of the logical network, and the first set of bindings received from the centralized controller and (ii) the second description of the physical network and the second set of bindings received from the local MFE; and
- providing the generated forwarding data to the local MFE to forward data messages in the logical network.

12. The non-transitory machine readable medium of claim 11, wherein the first description of the physical network comprises properties of the other MFEs including encapsulation information for tunneling packets to the other MFEs.

13. The non-transitory machine readable medium of claim 11, wherein the first description of the physical network comprises a table with records for each of the MFEs, a table with records for each tunneling protocol used by an MFE, and a table with records for each gateway port of a subset of the MFEs that join the logical network to external physical networks.

14. The non-transitory machine readable medium of claim 11, wherein the description of the logical network comprises a table with logical flow records generated by the centralized controller based on logical network descriptions received from the operator of the logical network using one or more management systems.

15. The non-transitory machine readable medium of claim 11, wherein the first set of bindings comprises a table with records for each logical port specifying a location in the physical network to which the logical port maps.

16. The non-transitory machine readable medium of claim 15, wherein the physical location in the physical network comprises a particular MFE for each logical port.

17. The non-transitory machine readable medium of claim 11, wherein the controller agent and the local MFE in are part of the virtualization software of the particular host computer, wherein the data compute nodes on the particular host computer execute on top of the virtualization software.

18. The non-transitory machine readable medium of claim 11, wherein the MFE is a flow-based MFE, wherein the generated forwarding data comprises flow entries.

19. The non-transitory machine readable medium of claim 17, wherein the data compute nodes logically connect to the logical network.

20. The method of claim 2, wherein the properties of the set of other MFEs are detected by the set of the controller agents executing with the other MFEs on the set of other host computers.

* * * * *